US010803689B2

(12) United States Patent
Forgione

(10) Patent No.: US 10,803,689 B2
(45) Date of Patent: Oct. 13, 2020

(54) SYSTEM FOR THE SIMPLIFIED AND SAFE MANAGEMENT OF THE ENTRANCES AND EMERGENCIES

(71) Applicant: K5 IMMOBILIARE S.P.A., Bologna (IT)

(72) Inventor: Francesco Forgione, Bologna (IT)

(73) Assignee: K5 Immobiliare S.p.a., Bologna (IT)

( * ) Notice: Subject to any disclaimer, the term of this patent is extended or adjusted under 35 U.S.C. 154(b) by 0 days.

(21) Appl. No.: 16/079,907

(22) PCT Filed: Feb. 24, 2017

(86) PCT No.: PCT/IB2017/051092
§ 371 (c)(1),
(2) Date: Aug. 24, 2018

(87) PCT Pub. No.: WO2017/145115
PCT Pub. Date: Aug. 31, 2017

(65) Prior Publication Data

US 2019/0057564 A1 Feb. 21, 2019

(30) Foreign Application Priority Data

Feb. 26, 2016 (IT) .......................... UB2016A001119

(51) Int. Cl.
*G07F 7/08* (2006.01)
*B60R 25/04* (2013.01)
(Continued)

(52) U.S. Cl.
CPC ................ *G07C 9/28* (2020.01); *G07C 9/22* (2020.01); *G07C 9/27* (2020.01); *G08B 21/22* (2013.01)

(58) Field of Classification Search
CPC .................................................. G07C 9/00111
See application file for complete search history.

(56) References Cited

U.S. PATENT DOCUMENTS 9,111,430 B2 * 8/2015 Kraus .................. G08B 25/005
2005/0080809 A1 4/2005 Vandorpe
(Continued)

FOREIGN PATENT DOCUMENTS

WO 2015/184517 A1 12/2015

OTHER PUBLICATIONS

International Search Report and Written Opinion dated Jun. 20, 2017 from International Patent Application No. PCT/IB2017/051092 filed Feb. 24, 2017.

*Primary Examiner* — Joseph H Feild
*Assistant Examiner* — Pameshanand Mahase
(74) *Attorney, Agent, or Firm* — David B. Tingey; Bryant J. Keller; Kirton McConkie

(57) ABSTRACT

The system for the simplified and safe management of the entrances and emergencies includes: a recording device arranged in the proximity of an entry/exit of a corporate site and having recording means of entry/exit data of staff, collaborators or visitors and a first storage unit of the entry/exit data; at least a verification device arranged in the proximity of at least an emergency gathering point of the corporate site and having a second storage unit of the entry/exit data and verification means of the entry/exit data, i verification means being able to verify the presence of persons inside the corporate site in the event of the occurrence of an emergency event; synchronization means of the entry/exit data present inside the second storage unit with the entry/exit data present inside the first storage unit.

8 Claims, 2 Drawing Sheets

(51) Int. Cl.

| | |
|---|---|
| ***G07C 9/28*** | (2020.01) |
| ***G08B 21/22*** | (2006.01) |
| ***G07C 9/22*** | (2020.01) |
| ***G07C 9/27*** | (2020.01) |

(56) References Cited

U.S. PATENT DOCUMENTS

| | | | | |
|---|---|---|---|---|
| 2006/0176167 | A1* | 8/2006 | Dohrmann ........... | G08B 25/001<br>340/506 |
| 2009/0079575 | A1* | 3/2009 | Bouressa ........... | G07C 9/00103<br>340/573.4 |
| 2010/0295656 | A1* | 11/2010 | Herickhoff ............. | H04L 63/08<br>340/3.1 |
| 2015/0228183 | A1 | 8/2015 | Rothkopf et al. | |
| 2016/0253747 | A1* | 9/2016 | Teixeira Campos ... | G06Q 10/02<br>705/18 |

* cited by examiner

SYSTEM FOR THE SIMPLIFIED AND SAFE MANAGEMENT OF THE ENTRANCES AND EMERGENCIES

CROSS REFERENCE TO RELATED APPLICATION(S)

This application is a U.S. National Stage Entry of International Patent Application No. PCT/IB2017/051092, filed Feb. 24, 2017, which claims the benefit of Italian Patent Application No. 102016000020494, filed Feb. 26, 2016, the disclosures of which are hereby incorporated entirely herein by reference.

TECHNICAL FIELD

The present invention relates to a system for the simplified and safe management of the entrances and emergencies, particularly usable in corporate sites.

BACKGROUND ART

Various systems and different methods are known for the management of the entrances and exits of the members of staff, collaborators or visitors in corporate sites or the like.

A first method, still widespread to date in particular for the control of the entrances by external visitors, involves the use of a paper register which can generally be found at the front desk of the company and manually filled in at each entrance/exit.

The limits of this solution are evident, because the manual filling takes time and is inevitably subject to filling mistakes or, worse still, to missed filling.

Furthermore, in the case of an emergency situation taking place due, e.g., to a fire, an earthquake or other sudden events, the paper register must be necessarily recovered by a member of the staff or, in any case, by the person in charge of security before the evacuation of the site.

In fact, the paper register is of fundamental importance in order to verify the possible presence of people in the site after the emergency event. This check must necessarily be carried out in order to verify the possibility that there are people trapped or injured in the site.

Nevertheless, it is evident that in the case of an emergency, it may frequently happen that the paper register is not recovered, resulting in the impossibility to carry out any kind of check on the staff, collaborators or visitors possibly present in the site.

Partly automated systems are also known for the detection of presences that, especially with regard to the staff, are based on the use of badges given to the staff and on the use of special reading devices suitably located at the entrance and exit.

Whenever an employee, or possibly, an external collaborator or a visitor enters or leaves the site, he/she places his/her badge close to the reading device and the system automatically records the entry/exit data.

Typically these entry/exit data are stored in a special database on a server that can be internal or external to the site itself.

Even this solution, however, has some limitations and drawbacks.

In fact, both in the event of the data being recorded on an internal server and in the event of these being recorded on an external server, it is anyway impossible to recover such information quickly if an emergency event occurs in order to check in real time the people present in the site.

Furthermore, if the server is positioned in the site, the server itself may be damaged resulting in a partial or total loss of the data.

DESCRIPTION OF THE INVENTION

The main aim of the present invention is to devise a system for the simplified and safe management of the entrances and emergencies that allows efficient, quick and precise recording of the entrances and exits in a corporate site and that, at the same time, is able to ensure an accurate and real-time check of the presences within a site in the case of a sudden emergency event.

Another object of the present invention is to devise a system for the simplified and safe management of the entrances and emergencies which allows overcoming the mentioned drawbacks of the prior art within the ambit of a simple, rational, easy and effective to use as well as affordable solution.

The aforementioned objects are achieved by the present system for the simplified and safe management of the entrances and emergencies according to the characteristics described in claim 1.

BRIEF DESCRIPTION OF THE DRAWINGS

Other characteristics and advantages of the present invention will become better evident from the description of a preferred, but not exclusive, embodiment of a system for the simplified and safe management of the entrances and emergencies, illustrated by way of an indicative, but non-limiting, example in the accompanying drawings in which.

EMBODIMENTS OF THE INVENTION

Figure 1:
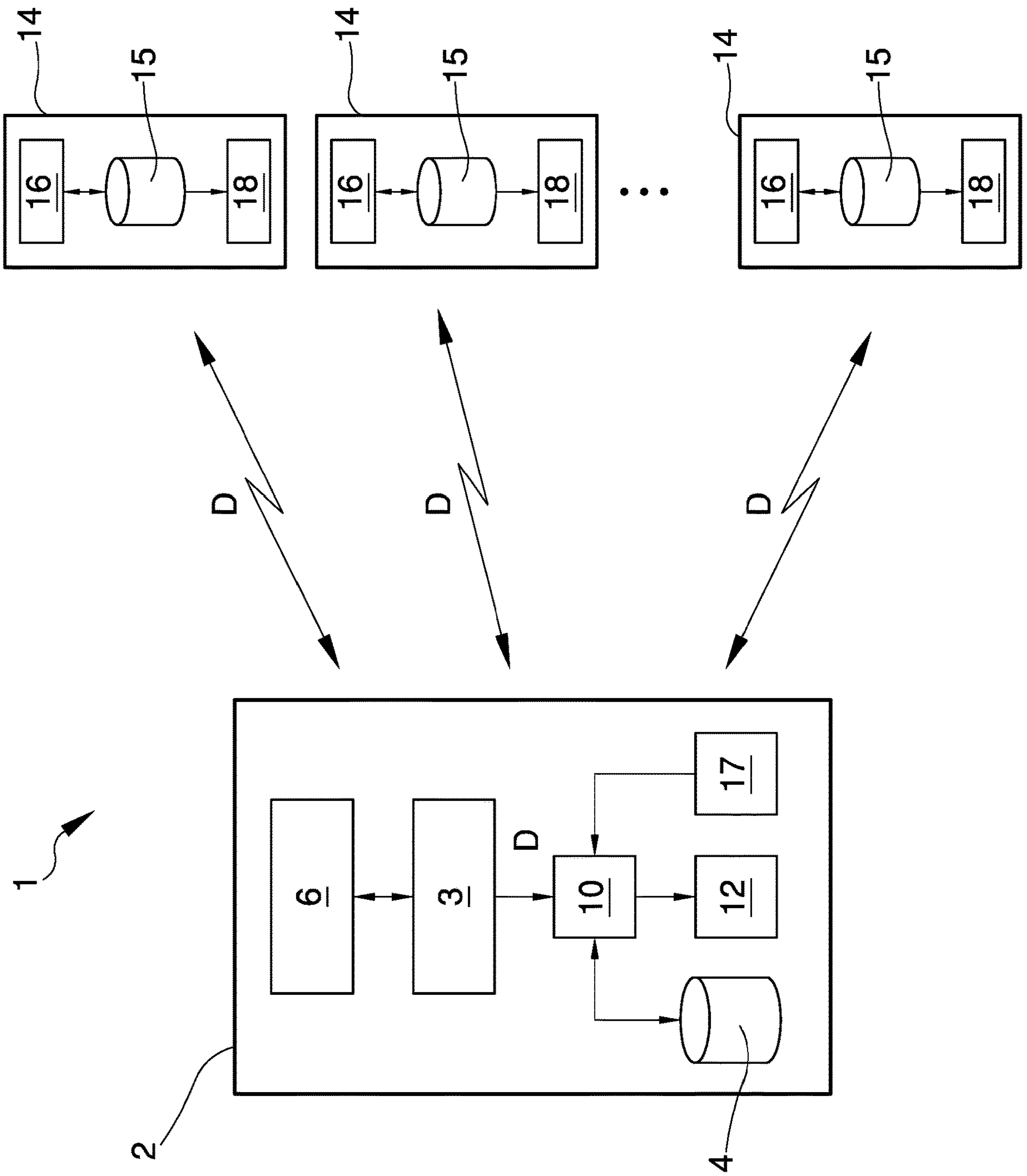
FIG. 1 is a general block diagram of the system according to the invention.

With particular reference to such figures, reference numeral 1 globally indicates a system for the simplified and safe management of the entrances and emergencies, particularly usable in corporate sites for the simple and efficient recording of the entrances and exits by staff and visitors and for the accurate and real-time check of the persons present in the site in the case of an emergency event.

It is specified that, in this discussion, by the wording "corporate sites" is meant any area intended to accommodate one or more organizational, production and sales premises or other type related to one or more companies or businesses.

The system 1 comprises at least a recording device 2 arranged in the proximity of at least an entry/exit of a corporate site and having recording means 3 of entry/exit data D of staff or visitors and at least a first storage unit 4 of said entry/exit data D.

For example, the recording device 2 may be positioned at the front desk of a company, for the recording of visitors, at the entries/exits dedicated to the staff, for the recording of the staff entrances, or even at the outside gates accessing the site.

In the latter case, in particular, it is possible to record staff, visitors, external consultants, suppliers and any other type of collaborator at the exact time of their accessing the site, effectively eliminating the possibility of a missing track of a person within the site in the case of a sudden emergency event.

The entry/exit data D enterable via the recording device 2 may e.g. comprise: entry/exit day, entry/exit time, user name, user surname, user company, site reference person, user signature, ID card number, ID card expiry date, reason of the visit.

The entering and recording of different types of additional data cannot however be ruled out.

Figure 3:
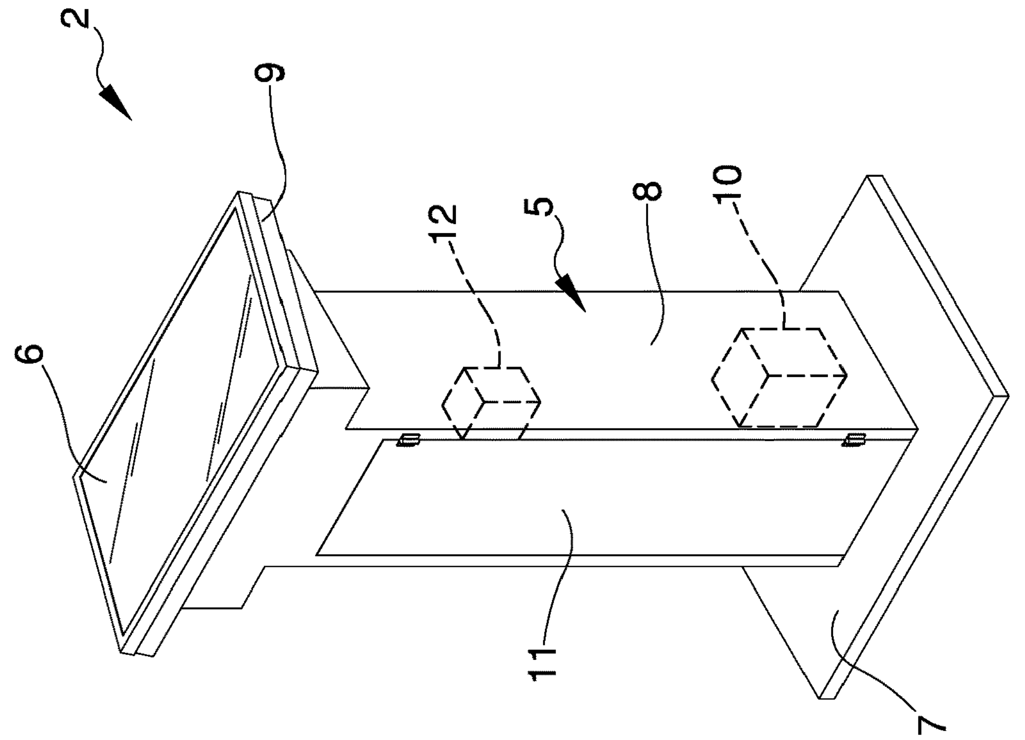
FIG. 2 and FIG. 3 are axonometric views illustrating a possible embodiment of a recording device of the system according to the invention.
Figure 2:
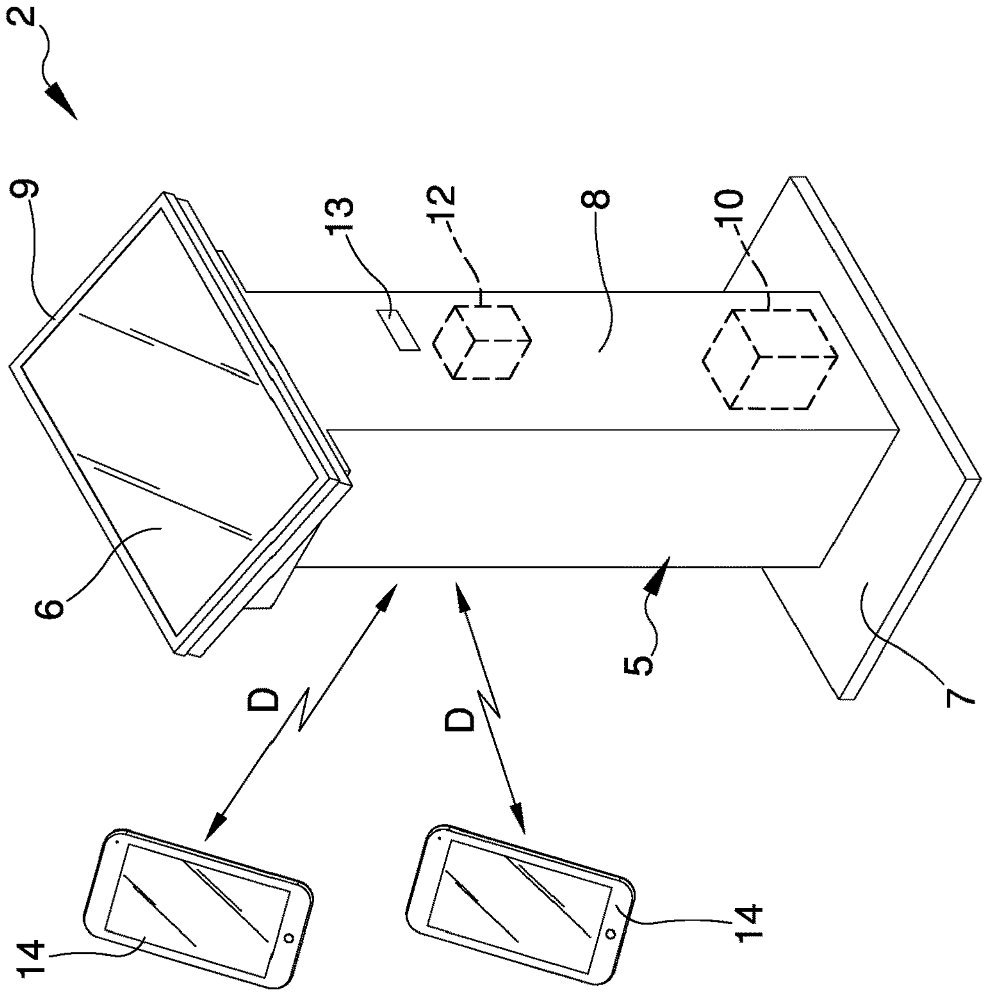

With reference to a preferred embodiment, illustrated in FIGS. 2 and 3, the recording device 2 is made up of an electronic totem having a support structure 5 and interface means 6 for recording the entry/exit data D.

Preferably, the interface means 6 are made up of a touch screen (touch screen monitor).

According to this preferred embodiment, the support structure 5 comprises a base 7 for resting on the ground and a sustaining post 8 that extends vertically from the base 7 and which has on top support means 9 of the touch screen 6. In practice, these support means 9 are made up of an appropriately dimensioned monitor holder.

In addition, the electronic totem 2 comprises a processing unit 10 operatively connected to the touch screen 6.

For example, this processing unit 10 may consist of a mini-pc housed in a special compartment formed inside the post 8. The compartment can be accessed through a special rear door 11 positioned on the post 8 itself.

The recording means 3 of the electronic totem 2 are preferably implemented using a software application installed on the processing unit 10 and provided with an appropriate graphical interface adapted to allow entering the entry/exit data D by the user and via the touch screen 6.

Usefully, the electronic totem 2 may be provided with a printer 12 of identification cards in which the entry/exit data D identifying the user are at least partly indicated.

Usefully, on the printed identification card may be indicated a temporary identification number uniquely associated with the user who performed the recording procedure.

Preferably, the printer 12 is made up of a thermal printer for printing identification labels. For example, the identification labels can be of the type of adhesive labels adapted to be applied to the clothes fabrics.

In this case, the processing unit 10 is also connected to the printer 12 and the post 8 has a slit 13 on the front for the exit of the printed labels.

In any case, it cannot be ruled out using different printers for the production of identification cards of a different type, such as e.g. plasticized, magnetic badges or the like.

Usefully, the electronic totem 2 can be provided with a camera for the acquisition of at least an image of the user.

Furthermore, the electronic totem 2 can be fitted with a reader of identification cards. For example, it can comprise a bar code reader, the type of a laser gun or the like, a magnetic badge reader or a proximity reader.

Usefully, the electronic totem 2 may be fitted with an USB port or a scanner.

For example, the USB port or the scanner can be used, subject to identification via the badge, in order to allow anyone (internal staff or external visitors) uploading, within the system 1, photos, comments and suggestions for improvement for security purposes.

In particular, it is pointed out that such a possibility of accessing the electronic totem 2 can be used as a simple and effective implementation of those that are commonly called "security corners" located within the companies, i.e. stations through which workers can contribute with proposals aimed at continuously improving the security and not only.

This allows, in particular, a growing awareness of workers also arising from the simplicity and user-friendliness of the electronic totem 2, as well as lower paper consumption.

Advantageously, the system 1 comprises at least a verification device 14 arranged in the proximity of at least an emergency gathering point in the corporate site and having at least a second storage unit 15 of the entry/exit data D and verification means 16 of such data.

In particular, the verification means 16 are implemented by means of a software application installed on the verification device 14 and having an appropriate graphical interface adapted to allow the verification of the presence of people in the corporate site in the case of an emergency event, such as a fire, an earthquake or any other type of dangerous or potentially dangerous event.

In particular, according to a preferred embodiment of the system 1, schematically shown in FIG. 2, each verification device 14 used is made up of a mobile device.

Preferably, such a verification device 14 is made up of a tablet or a similar mobile device.

Still according to a preferred embodiment, the system 1 provides for the use of a plurality of such verification devices 14, located at respective gathering points in the site.

Advantageously, moreover, the system 1 comprises synchronization means 17 adapted to synchronize the entry/exit data D present inside the second storage unit 15 of each verification device 14 with the entry/exit data D present inside the first storage unit 4 of the electronic totem 2.

In particular, such synchronization means 17 may consist of export means adapted to export, at predefined time intervals and towards the second storage unit 15 of the verification devices 14, the entry/exit data D present inside the first storage unit 4 of the electronic totem 2.

Specifically, such export means 17 may be implemented by means of a software program installed on the processing unit 10 of the electronic totem 2. Such software program may consist e.g. of a scheduled batch program.

This way, therefore, the entry/exit data D entered via the electronic totem 2 are first stored on the first storage unit 4.

Subsequently, periodically and thanks to the export means 17, the entry/exit data D are sent to the respective second storage units 15 of each of the verification devices 14 used and located inside the gathering points.

In case of a sudden emergency event, resulting in the evacuation of all members of the staff and visitors present in the site towards the predefined gathering points, the entry/exit data D present on the second storage units 15 of the verification devices 14 therefore show the situation, in terms of people present in the site at the time of the sudden emergency event.

The verification means 16, consisting of a specific software application installed on each verification device 14, allow for the verification of the presence or absence of people inside the corporate site at the time of the emergency event.

In particular, such verification means 16 provide for the use of a graphical interface provided with display means of a complete list of data relating to persons present in the site at the time of the emergency event.

Furthermore, the graphical interface of such verification means 16 comprises means for the manual selection and removal from the displayed list of the data relating to persons identified in the gathering point. Specifically, these means for the manual selection and removal can be implemented on the graphical interface by means of special check flags of the identified persons.

Usefully, in the case of using a plurality of verification devices 14, in particular if located in different gathering points, each verification device 14 may be provided with updating means 18 adapted to update and synchronize data.

In particular, these updating means, implementable by means of a dedicated software module, are adapted to update the entry/exit data D present on the second storage unit 15 of one of the verification devices 14 depending on the changes made to the entry/exit data D stored on the second storage unit 15 of another verification device 14.

This way, lists are always updated on each verification device 14 and the check of people who can possibly be present in the site can be carried out quickly and effectively.

It has in practice been observed that the described invention achieves the intended objects.

In particular, the fact is underlined that the use of the electronic totem 2 at the entries or exits of a site, together with the use of mobile verification devices 14 located at predefined gathering points, and together with synchronization means 17 of the entry/exit data between the first one and the second ones, allows for an efficient, simple, fast and accurate recording of the entries and exits in a corporate site and, at the same time, ensures a simple, accurate and real-time verification of the presences within such site in the case of a sudden emergency event.

The invention claimed is:

1. A system for the simplified and safe management of entrances and emergencies, wherein the system comprises:

at least a recording device arranged in proximity to at least an entry/exit of a corporate site and having recording means of entry/exit data of staff, collaborators or visitors and at least a first storage unit of said entry/exit data;

at least a verification device arranged in proximity to at least an emergency gathering point of said corporate site and having at least a second storage unit of said entry/exit data and verification means of said entry/edit data, said verification means being able to verify the presence of the persons inside said corporate site in occurrence of an emergency event; and synchronization means of the entry/exit data present inside said second storage unit with the entry/exit data present inside said first storage unit, wherein said recording device comprises at least an electronic totem having a support structure and interface means for recording said entry/exit data, wherein said recording device comprises at least a processing unit operatively connected to said interface means, wherein said synchronization means comprise export means at predefined time intervals and towards said second storage unit of said entry/exit data present inside the first storage unit, wherein said verification means comprise display means of a list of data relating to persons present in the site at a time of the emergency event, wherein said verification means comprise means for a manual selection and a removal from said displayed list of the data relating to persons present in the gathering point following the emergency event, wherein the system further comprises a plurality of said verification devices located at respective gathering points, and wherein the system further comprises updating means of the entry/exit data on the second storage unit of one of said verification devices depending on changes made to the entry/exit data stored on the second storage unit of another of said verification devices, following said emergency event.

2. The system according to claim 1, where said interface means comprise at least a touch screen.

3. The system according to claim 1, wherein said support structure comprises a base for resting on a ground and a sustaining post that extends vertically from said base and which has support means of said interface means on a top.

4. The system according claim 1, wherein said recording device comprises a printer of identification cards in which said entry/exit data are at least partly shown.

5. The system according to claim 1, wherein said entry/exit data are selected from the group comprising: entry/exit day, entry/exit time, user name, user surname, user company, site reference person, user signature, ID card, ID card expiry date, and reason for a visit.

6. The system according to claim 1, wherein said verification device comprises a mobile device.

7. The system according claim 1, wherein said recording device comprises at least a reader of identification cards.

8. The system according to claim 1, wherein said recording device comprises at least an USB port.

* * * * *